(12) United States Patent
Acres

(10) Patent No.: US 7,197,829 B2
(45) Date of Patent: Apr. 3, 2007

(54) LASER GUIDED CELESTIAL IDENTIFICATION DEVICE

(76) Inventor: John F. Acres, 4314 SW. Research Way, Corvallis, OR (US) 97333

( * ) Notice: Subject to any disclaimer, the term of this patent is extended or adjusted under 35 U.S.C. 154(b) by 0 days.

(21) Appl. No.: 11/120,394

(22) Filed: May 2, 2005

(65) Prior Publication Data
US 2005/0246911 A1    Nov. 10, 2005

Related U.S. Application Data

(60) Provisional application No. 60/568,441, filed on May 4, 2004.

(51) Int. Cl.
G01C 17/34    (2006.01)

(52) U.S. Cl. .............. 33/268; 33/DIG. 21; 33/355 R; 33/366.11

(58) Field of Classification Search ............. 33/227, 33/268, 276–279, 282, 283, 286, DIG. 21, 33/365, 366.11, 355 R
See application file for complete search history.

(56) References Cited

U.S. PATENT DOCUMENTS

| | | | |
|---|---|---|---|
| 2,372,487 A | 3/1945 | Hagner | |
| 2,754,597 A | 7/1956 | Sylvester | |
| 2,814,879 A | * 12/1957 | McKnight | 33/277 |
| 2,994,971 A | 8/1961 | Meisenheimer et al. | |
| 3,257,728 A | 6/1966 | Blomquist | |
| 3,769,710 A | 11/1973 | Reister | |
| 3,840,726 A | 10/1974 | Harrison | |
| 4,096,646 A | 6/1978 | Solem | |
| 4,104,722 A | 8/1978 | Evans | |
| 4,244,651 A | * 1/1981 | Roof | 33/268 |
| 4,387,999 A | * 6/1983 | Shelley | 33/268 |

(Continued)

FOREIGN PATENT DOCUMENTS

JP    0226787    10/1991

OTHER PUBLICATIONS

Caruso, M.J., Applications of Magnetoresistive Sensors in Navigation Systems; Feb. 1998; pp. 1-7.

(Continued)

Primary Examiner—G. Bradley Bennett
(74) Attorney, Agent, or Firm—Marger Johnson & McCollom, PC

(57) ABSTRACT

Disclosed is a celestial identification device. According to some embodiments, the device includes a housing, a positioning sensor, and a light generator structured to generate an indicator beam that can be pointed at celestial objects. The positioning sensor can include sensors to determine altitude and azimuth of the device. The light generator can be a laser and mounted to a moveable pivot or deflected by mirrors and/or lenses such that the light beam points in a different direction than the housing. The device can be coupled to a feedback device, such as an audio player to communicate information about celestial objects to a user. The device can also contain or be coupled to a database of celestial objects such that, when combined with the positional data of the device, can determine at which object the device is pointing. Further, in some embodiments, a celestial device can be selected from the database, and the device operates to point the indicator beam at the selected object, regardless of in which direction the device is pointing.

74 Claims, 4 Drawing Sheets

U.S. PATENT DOCUMENTS

Figure 2:
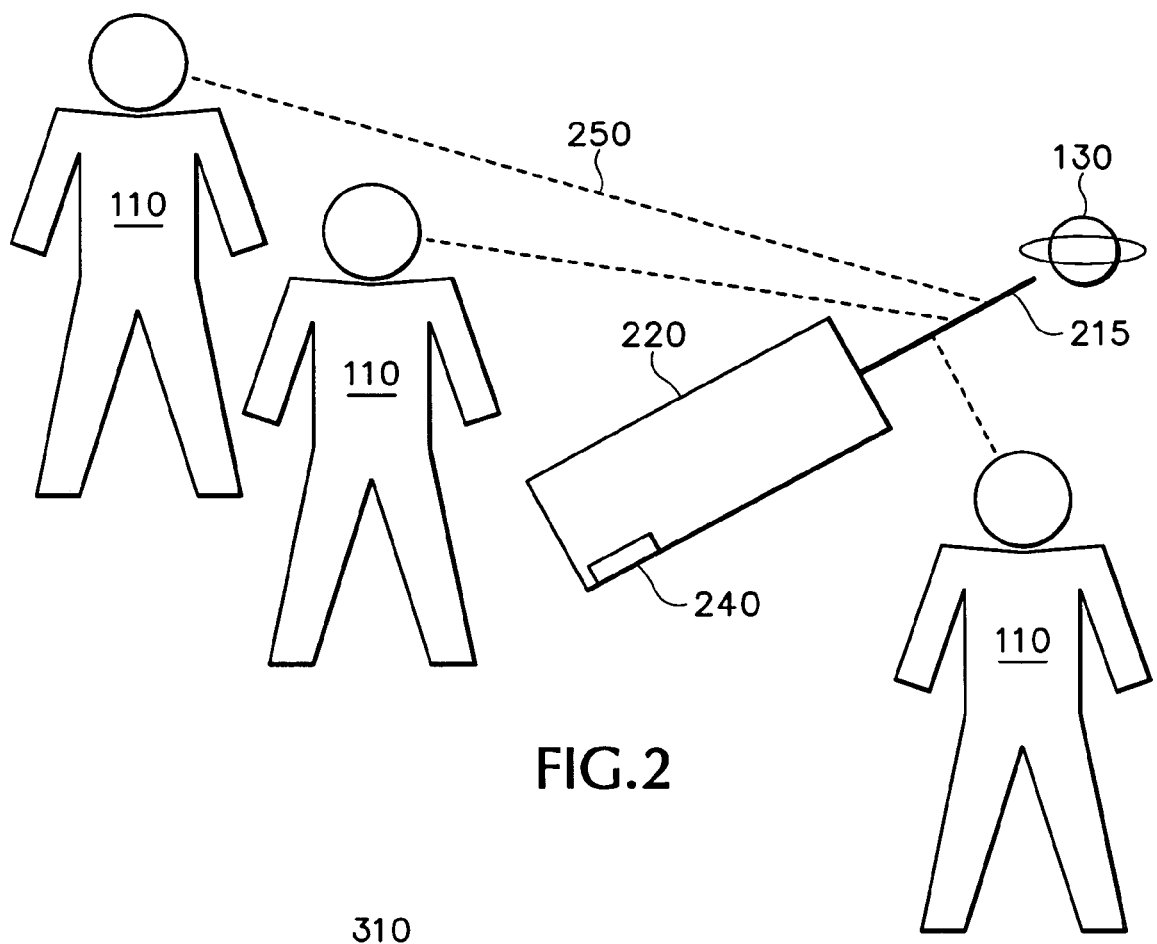

| | | |
|---|---|---|
| 4,621,329 A | 11/1986 | Jacob |
| 4,702,011 A | 10/1987 | Sigley |
| 4,764,881 A | 8/1988 | Gagnon |
| 4,930,888 A | 6/1990 | Freisleben et al. |
| 4,938,697 A | 7/1990 | Mayer |
| 4,944,587 A | 7/1990 | Harigae |
| 4,970,793 A | 11/1990 | Alamian |
| 5,003,698 A | 4/1991 | Vuarnesson |
| 5,133,050 A | 7/1992 | George et al. |
| 5,155,327 A | 10/1992 | Hoag |
| 5,161,242 A | 11/1992 | Boulay |
| 5,269,065 A | 12/1993 | Ida |
| 5,311,203 A | 5/1994 | Norton |
| 5,526,574 A * | 6/1996 | Dash et al. .................. 33/228 |
| 5,546,309 A | 8/1996 | Johnson et al. |
| 5,574,465 A * | 11/1996 | Okada ........................ 342/352 |
| 5,704,653 A | 1/1998 | Lee |
| 5,784,792 A * | 7/1998 | Smith ........................... 33/227 |
| 5,815,411 A | 9/1998 | Ellenby et al. |
| 6,056,554 A | 5/2000 | Samole |
| 6,172,747 B1 | 1/2001 | Houlberg |
| 6,366,212 B1 | 4/2002 | Lemp |
| 6,570,506 B2 | 5/2003 | Lemp |
| 6,694,630 B2 * | 2/2004 | Dang et al. ................... 33/286 |
| 6,796,038 B2 * | 9/2004 | Humphries ............. 33/DIG. 21 |
| 6,844,822 B2 * | 1/2005 | Lemp, III .................... 33/628 |
| 2003/0218546 A1 | 11/2003 | Lemp |
| 2005/0030189 A1 * | 2/2005 | Foster .......................... 33/268 |

OTHER PUBLICATIONS

Stork, T., Electronic Compass Design using KMZ51 and KMZ52; Mar. 30, 2000; pp. 1-38.

Mesmic, Accelerometer Fundamentals; pp. 1-7.

* cited by examiner

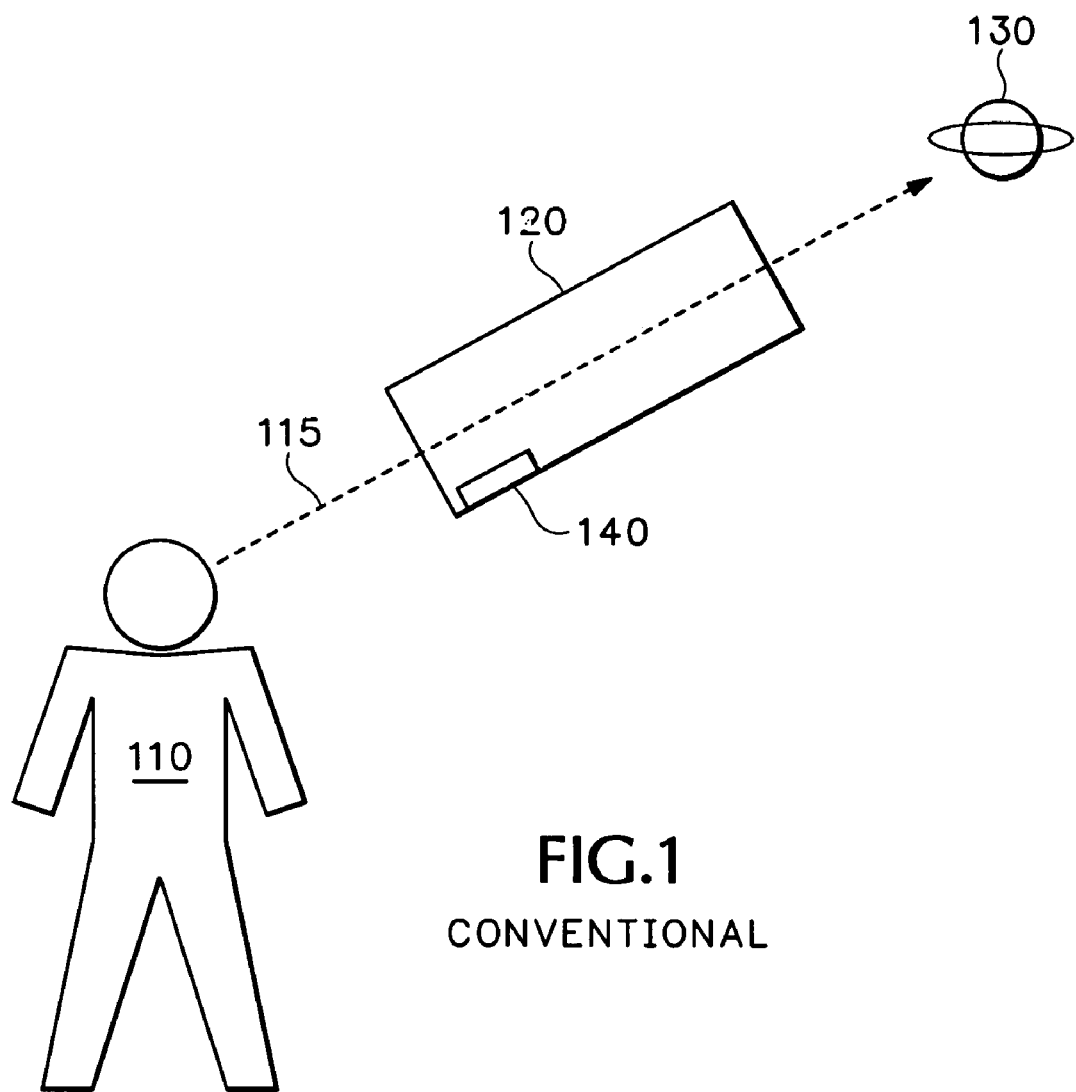
FIG.1
CONVENTIONAL

LASER GUIDED CELESTIAL IDENTIFICATION DEVICE

CROSS REFERENCE TO RELATED APPLICATIONS

This application claims priority from U.S. provisional application 60/568,441, filed on May 4, 2004, the contents of which are expressly incorporated herein by reference.

TECHNICAL FIELD

This disclosure relates to devices for celestial observation, and, more particularly, to a device for locating and identifying celestial objects.

BACKGROUND OF THE INVENTION

Humans have forever been intrigued by the night sky. Stars and other celestial objects have religious, scientific, emotional and mythical importance to peoples of all cultures. Countless books and stories describe specific stars, star groupings and other celestial objects but most people find it difficult to locate a specific object in the sky. Many devices have been created to help, including two and three dimensional planispheres and other such aids.

Optical instruments such as binoculars and telescopes are often mounted on sturdy platforms and equipped with rotational sensors to determine the azimuth and altitude at which the instrument is pointed. Azimuth and altitude are a coordinate system that allows unambiguous determination of a direction from a given point, as described below. A connected computer can use the azimuth and altitude information coordinates, along with current time, date and viewing location to determine the celestial coordinates at which the instrument is pointing, and determines from a database of celestial objects the object at which the instrument is pointed. Information about that object is then retrieved from the database and made known to the user, typically through visual means, such as by producing text on a computer screen.

Such optical instruments are useful not only to identify the object at which the instrument is pointed, but also to locate an object of interest to the viewer. The user specifies the object of interest, for example the star Sirius. If the instrument is equipped with motors, the instrument can be controlled to change its azimuth and altitude until it matches the current location of Sirius. Alternatively, the instrument can provide directional cues to the user so he can manually adjust the instrument until it points at the current location of Sirius. Such optical instruments are widely available and well known to those skilled in the art of telescopes or astronomy. These instruments perform well but are relatively heavy, require alignment and a solid physical mounting.

Some optical instrument designs reduce these limitations by replacing the rotational sensors with sensors of Earth's gravitational pull and magnetic field, thereby eliminating the needs for alignment and the solid physical mounting, thus allowing handheld operation. These designs still require sighting of the object of interest through a viewing axis which can obstruct the user's view of the object and require uncomfortable positioning of the viewing device. Further, requiring that the observation take place along a viewing axis makes such devices unusable by more than one person at a time.

Embodiments of the invention address these and other limitations in the prior art.

SUMMARY OF THE INVENTION

Embodiments of the present invention advance the art of celestial object identification and location by using a bright light beam, such as a laser beam as a pointer to the celestial object of interest, allowing a more enjoyable view of the sky, while holding the locating device in a more comfortable position than in previous devices. Further, the laser beam is visible to nearby viewers, and not just to the operator, and does not suffer from parallax errors inherent to prior art optical sighting devices. Additionally, embodiments of the invention offer improvements in the art of sensing Earth's magnetic field and gravitational pull by strategic placement of sensors.

Embodiments of the invention improve the ease and comfort of locating and identifying celestial objects by using a laser beam that is projected into the sky on an axis coaxial to a reference plane, and acts as a pointer to the object of interest. In another embodiment, the laser beam is controllably aimed in a direction that is not coaxial with the reference plane. The beam can also be used to outline a larger celestial object such as a constellation or to indicate the direction in which to aim the locating device to find a specific object.

Embodiments of this invention are compatible with and can utilize commercially available digital music players, cell-phones, personal data assistants, personal computers or other feedback devices to communicate with the user.

Other embodiments of this invention are directed to procedures to efficiently determine altitude through strategic placement of a gravitational sensor, thus improving the range, accuracy and utility of the celestial locating device.

DETAILED DESCRIPTION OF THE PREFERRED EMBODIMENTS

An object's location in the sky is unambiguously defined by its azimuth and altitude. Azimuth is a measured angle, on a plane approximately parallel with the Earth's surface, between a desired direction and a reference direction such as north. East, for example is an angle +90 degrees away from north, while south is ±180 degrees from north, and west +270 degrees away. North, south, east, and west are all representations of azimuth. Altitude is a measured angle on a plane perpendicular to the Earth's surface. By convention, an altitude of zero degrees points toward the horizon while an azimuth of ninety degrees points directly overhead.

With reference to FIG. 1, the traditional way to determine an object's coordinates is to construct an aiming device, hereafter referred to as "aimer ", by equipping an optical viewing device 120 with altitude and azimuth sensors 140 that are aligned with a viewing axis 115 of the viewing device. The viewer 110 sights an object of interest 130 along the viewing axis 115 and, when the object is aligned along the viewing axis, altitude and azimuth readings are taken. The aimer 120 may include lenses and/or mirrors to magnify or otherwise enhance the viewed image. Alternatively, the aimer 120 can be a simple tube or channel without lenses or mirrors. The viewer 110 manipulates the orientation of the aiming device 120 until the desired object 130 is visible through it, at which point the aimer 120 is oriented in the proper azimuth and altitude for the object from the location in which the aimer is situated. To improve the accuracy of alignment, the aimer 120 is sometimes equipped with crosshairs, sighting circles or other typical alignment markings. It is also possible to aim through a separate viewer (not shown) that can be placed alongside, and parallel to, the aimer 120, such as a common gun sight can be placed along a rifle barrel.

Aimers 120 that depend upon optical alignment require the viewer 110 to look into one end of the instrument and manipulate the aimer's orientation until the object of interest becomes visible through the opposite end. Several disadvantages result from such a setup, for example: the viewing channel can obstruct the view, the viewing position can be uncomfortable to position in front of the eye and the viewing system is not simultaneously useable by multiple people.

Some embodiments of the invention address these disadvantages by projecting a visual beam 215 into the sky that extends coaxially to an axis of an aimer 220 and towards the object of interest 130, as represented in FIG. 2. Viewers 110 locate themselves in any convenient nearby position where the beam 215 is visible 250 without having to align themselves along the long axis of the aimer 220. Sensors 240 measure altitude and azimuth. The visible beam 215 is preferably small enough in diameter and beam divergence so as to make clear which object 130 is the object of interest.

A laser of visible wavelength can be a good source for projecting such a visible beam 215 of light. Lasers that emit light in the wavelengths of between approximately 509 to 535 nm, which the human eye perceives as green, are highly effective since the human eye is particularly sensitive to these wavelengths. The laser beam itself is not visible to the human eye as it travels into the sky. Earth's atmosphere contains dust and other particles that reflect the visible energy of the beam back to the viewer 110, giving the appearance of a long, thin line that extends far into the sky. The beam 215 is visible to everyone near the projection and there is no need to align the eye with the beam to know exactly which object is being pointed to.

By controllably deflecting the laser beam from an axis coaxial with the alignment of the aimer 220, large objects, such as constellations, can be traced by moving the beam 215 in a circle or oval around the object or by sequentially pointing to each of its components separately. By varying the intensity of the beam 215 as it is being deflected, multiple specific pointers can seem to simultaneously or sequentially appear and highlight particular objects of interest.

Other methods of generating a bright visible beam 215 that is small in diameter and has a low angle of beam divergence may be used and are anticipated by this invention.

Mechanisms to move or deflect a light beam in one or two axes are well known, as are methods of interrupting or modulating the intensity of the beam. Such mechanisms are commonly used in laser light shows and within indoor planetariums. One way to create beam motion or deflection is to mount the light generating device itself on a moveable pivot and to move the generating device about the pivot point, thereby changing the direction of the generated light beam output. A preferable mechanism leaves the light generating device in a stationary position and then deflects the beam emitted from it with mirrors and/or lenses attached to motors, galvanometers, voice coils or other positioning mechanisms. Other methods utilize liquid lenses, early generations of which have been developed for camera and other optical instruments. Liquid lenses can be focused at different targets by applying an electrical signal to reshape the liquid lens. They can also serve to deflect the beam 215 to different areas of the sky. Beam interruption or modulation is readily accomplished by either varying the power delivered to the light generating device or causing an optical obstruction of the beam at particular times and locations.

Figure 3:
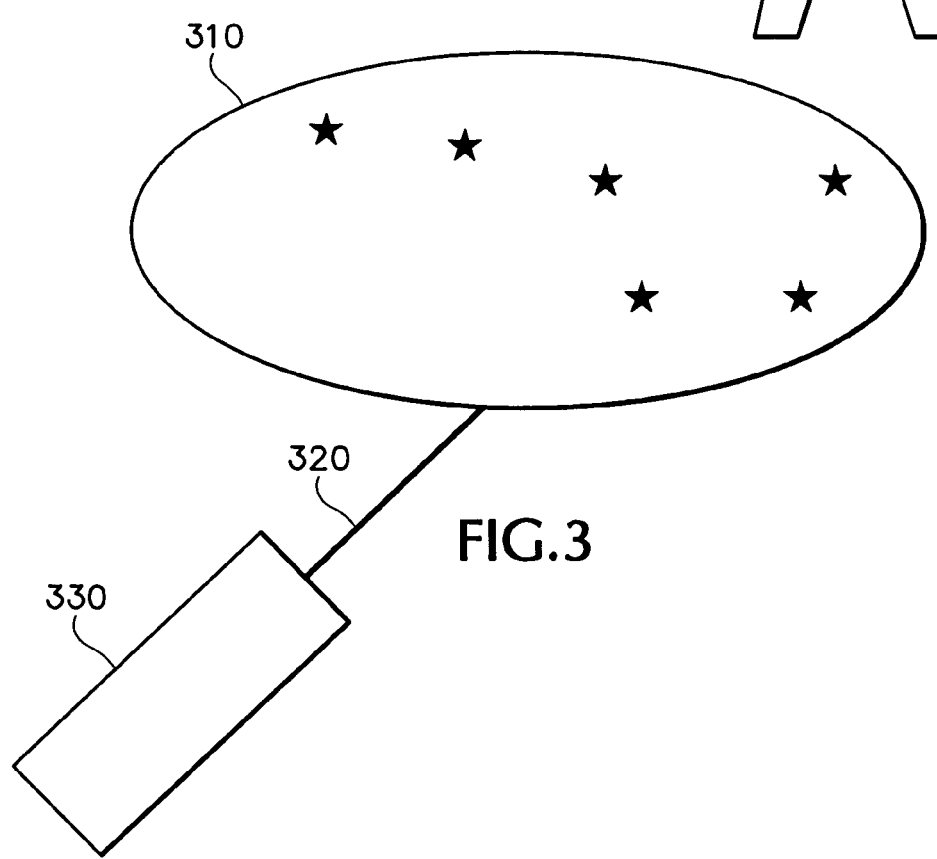

Embodiments of the invention can use any mechanism to deflect a light beam along one or more axes from that of the aimer 220 and/or modulate the intensity of the beam 215 to highlight particular objects or areas of the night sky. FIG. 3 shows the Big Dipper asterism 310 outlined by a light beam 320 emitted and controlled by an aimer 330. The aimer 330 senses its own current altitude-azimuth (alt-az) orientation and also knows the present location of each star of the Big Dipper 310. It then deflects the light beam 320 in direction and amplitude from the orientation of the aimer 330 so as to illustrate the outline of the Big Dipper 310. The aimer 330 may additionally readjust the angle of the emitted beam 320 to account for the Earth's rotational movement as time passes and/or the user's hand movements (if the aimer 330 is handheld) and/or the motion of any platform that the aimer 330 is affixed to. In other embodiments, the beam 320 could be modulated to sequentially point out each star individually, without ever having to reposition the aimer 330 itself.

Deflection of the light beam 320 is also useful for guiding the user to a specific object. The light beam 320 is normally emitted in a line that is coaxial to a reference plane in the aimer 330 so that the beam travels in the same direction as that at which the aimer is "pointed". Using the earlier described beam deflection techniques, the beam 320 can be caused to radiate at an angle to the aiming device 330 that indicates the general location of the object being sought.

Figure 4:
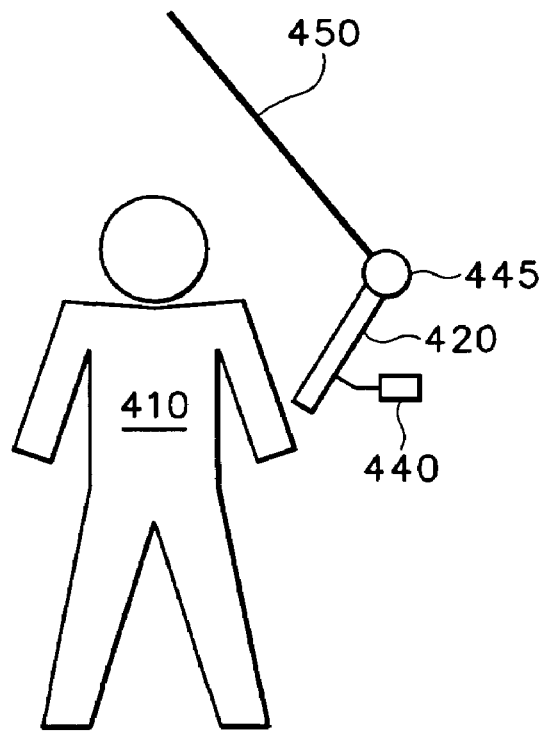

FIG. 4 represents a user 410 holding an aimer 420 that is pointing south on a December evening while standing in North America. The aimer 420 is instructed to locate the star Betelgeuse 430, which is then located at 115 degrees azimuth and 33 degrees altitude. The user 410, not knowing where Betelgeuse 430 is located, points the aimer 420 at a random area of the sky, in this example the aimer 420 is pointed in the general direction of 180 degrees azimuth and 45 degrees altitude. A computer 440 associated with the aimer 420 calculates the location of Betelgeuse 430 relative to the altitude and azimuth at which the aimer is then pointed.

Betelgeuse is to the left (by 65 degrees) and 12 degrees closer to the horizon as compared to the current direction of the reference plane of the aimer 420. The aimer 420 includes a beam deflector 445 coupled to the computer 440 and causes the beam 450 to deflect toward the left and downward of the aimer direction. The user then repositions the aimer 420 toward the direction of the beam 450. While the aimer 420 is being moved, it continuously compares the alt-az direction in which it is aimed to that of the desired object and adjusts the beam position accordingly. The angle of beam deflection diminishes as the aimer 420 is brought closer to the alt-az coordinates of the desired object 430. When the beam 450 is again parallel with the reference plane of aimer 420, the aimer is pointed directly at the object of interest 430.

The laser guided aimer just described with reference to FIGS. 2–4 may be hand-held or mounted on a tripod, telescope mount, binocular chair or other such fixture and may be used with or without optical or radio instruments. The aimer may consist of a single module or configured in multiple modules such as a hand-held pointer and wrist mounted display and input subsystem. Such mountings and configurations are well-known to those skilled in the state of the art of astronomy and optical or radio astronomy instrumentation and are anticipated by this invention.

One useful example of modularity is to use the resources of a commercially available or custom music player, personal computer, personal data assistant, cell phone or other electronic device, as a communication feedback system. For example, the Laser Guided Aimer (LGA) could communicate its angular position to a personal computer that contains a database of celestial objects. The personal computer could store the current time, date and location and then convert the alt-az information from the LGA into the coordinates under which the celestial database is organized. Although hereinafter referred to as LGA, it is understood that any light generator, and not only a laser, may be employed to generate a light beam in embodiments of the invention.

The computer could then use typical computer audio circuitry to play an audio recording about the just-located specific object or event that area of the sky. The computer could alternatively, or simultaneously, present a visual map of the sky area on its display or even activate an animation or video clip. A computer keyboard could be used to enter commands from the user about which object to locate next. Alternatively, the computer could accept voice commands from the user. The computer could send information back to the LGA, instructing it about when to turn on its laser beam and if, when, where and to deflect or modulate the beam, as described above.

A digital music player such as an MP3 player or Apple iPod could connect to an LGA and utilize its storage, audio playback, input device and display screen resources. Similarly a personal data assistant such as one in the Palm Pilot series could be used as could a cell phone with appropriate resources.

Such external devices may or may not require additional custom programming to serve this purpose. Embodiments of the invention can be used with any electronic device having a display, computational capability, storage, audio playback, keyboard input, or other input gathering resources and compatible interface.

Each LGA according to embodiments of the invention need not necessarily include all of the functionality above described, and may instead may be of limited capability. For instance, some embodiments may contain only positional sensors and a light beam. In other words, all of the functions required to identify and describe celestial objects are not required in all embodiments. Also, any combination of these functions could be allocated between an external module and the LGA. All such combinations are specifically contemplated by this invention.

Measuring Altitude and Azimuth

Though simple in concept, altitude and azimuth (alt-az) are difficult to reliably and readily determine. The Earth causes two natural forces that are useful in determining alt-az: gravity and the magnetic field. Earth's gravity is a constant force that attracts all mass towards the center of the Earth. The force of gravity can be considered as being perpendicular to the Earth's surface; an effect that is obvious when observing a water-filled glass. As the glass is tilted, the water's surface stays parallel with the horizon.

Inclinometers are instruments that sense the angle of incline as compared to that of a level surface (perpendicular to Earth's gravitational pull). Inclinometers typically use Earth's gravity as the reference against which to measure the angle of incline.

Inclinometers may be oriented to sense a change in incline along any axis. Convention defines two relative axes called "pitch" and "roll" which are oriented at right angles to each other in a plane perpendicular to Earth's gravitational pull. Pitch is the angle of inclination in the primary direction of orientation or travel. For example, an aircraft's pitch changes as its nose goes up or down. Roll is the side to side inclination. Again using the aircraft analogy, roll inclination changes when one wing moves up or down relative to the other.

One long-used method to determine incline places a weight on one portion of an edge of a shaft that is connected to a sensor configured to measure rotation, such as a potentiometer or other shaft encoder. The shaft is designed to easily turn and the assembly is mounted so the shaft is parallel with the Earth and perpendicular to the orientation along which the inclination angle is to be measured. The sensor's body is attached to the device for which inclination is to be measured. As inclination changes, the weighted shaft is pulled upon by gravity causing the potentiometer's resistance to vary in proportion to the change in incline. Another long-used method to determine incline is the fluid filled cylinder. The cylinder is only partially filled—typically about halfway. The cylinder is attached to the object being measured. As the object rotates, gravity keeps the fluid level on a line perpendicular to gravity. The containing cylinder is equipped with sensors to determine what portion of the cylinder the fluid is contacting, typically using capacitance or resistance. Fluid based inclinometers can be configured to work in the roll and pitch axes simultaneously. Fluid-based inclinometer systems require time to settle after being moved, especially if the move was sudden or forceful. Additionally they are fragile, making them difficult to use in an aimer.

More recently, subminiature accelerometers have been adapted to measure inclination angles. Accelerometers are devices that sense changes in velocity and subminiature versions exploit a variety of technologies including strain gauge, thermal, capacitive, piezoelectric and resistive techniques.

Since gravity provides a constant acceleration in a very specific direction, any rotation of the sensing accelerometer relative to that direction will cause a change in the sensed accelerative force. Accelerometers can be aligned in either or both of roll or pitch axes or along other, arbitrary sensing orientations.

A preferred method of sensing incline in embodiments of the invention is to use an accelerometer. As described above, an accelerometer is an electromechanical device that can be configured to produce an electrical signal representative of the angle of tilt or altitude. Examples of accelerometers are the ADXL202 from Analog Devices, Inc. and the MXD2020 from Memsic Devices. While these devices differ in internal construction, each outputs an electrical signal that varies with motion and positional angle in proportions that are well known to those skilled in the art of designing motion sensors and inclinometers. The nature of such electrical signals along with guidance on how to use them to measure positional angle (also called tilt or incline) are readily available in application notes and specification sheets published by accelerometer manufacturers. One such application note is #AN-00MX-001, published by Memsic Devices and incorporated herein by reference.

Accelerometer sensors have maximum sensitivity to changes in rotation when they are near-perpendicular orientation to earth's gravitational field, and lose nearly all sensitivity to rotation when oriented parallel to earth's gravitational field. Practically speaking, accelerometer sensors are not very useful when placed within about 30 degrees of parallel to earth's gravitational field because of this decreased sensitivity.

In embodiments of the invention, such problems are overcome by using two accelerometer elements oriented perpendicular to each other and calculating orientation angle as a function of the arctangent of the one sensor's readings divided by the other. This technique is well known to those skilled in the art of accelerometer design and allows accurate sensing over a full 360 degree rotation in a single plane. Memsic application note #AN-00MX-007 is incorporated herein by reference. Changes in pitch are accurately sensed by such said pair of accelerometer sensors, but only so long as they are held constantly perpendicular to earth's gravitational pull in the roll plane. Any deviation in the roll plane will cause one or both sensors to erroneously sense rotation in the pitch plane.

It is possible to simultaneously sense rotation in the roll plane and use that information to make corrections to the pitch plane readings. Such systems require additional accelerometer elements in the roll plane and require more complex computations and sensing strategies.

The Earth's magnetic field is not as powerful or as stable as its gravitational force but is nevertheless useful for determining azimuth. Compasses, for example, have been used for many hundreds of years to determine direction of travel. A compass is constructed of a magnetized element placed on a low-friction support. The magnetized element will move to align itself with the Earth's magnetic field and can be viewed directly as a visual directional indicator or sensed electronically for automated uses. Such compasses have long proven useful but are fragile and must be kept relatively parallel to the Earth's surface for reliable operation.

More recently non-moving magnetic field sensors have become available that can be caused to produce an electronic signal in proportion to how the sensor is oriented with the Earth's magnetic field. The signal is at maximum when aligned in parallel with the field (north-south) and minimum which aligned at right angles (east-west). Such sensors further emit a difference of polarity according to orientation. A sensor aligned in a north-south orientation produces a positive signal while a south-north orientation produces a negative signal. The terms positive and negative are relative terms, the point being that polarity changes with a 180 degree change in direction.

Magnetic field sensors are commercially available from several sources. Examples include the Honeywell HMC-1021, Philips Semiconductor KMZ51 and KMZ52 and the Precision Magnetics Inc. (PNI) Sen-S65. While these sensor types use differing technologies, the result is the same: an electrical signal that varies in proportion to its alignment with the Earth's magnetic field. Such components and their uses are well known to those skilled in compass design. Honeywell's application note entitled "Applications of Magnetoresistive Sensors in Navigation Systems" and Philips Electronic's Application Note AN00022 are herein incorporated by reference.

When electronic sensors are used to determine azimuth by using Earth's magnetic field, two sensors can be oriented at right angles to each other in one plane but with both sensors still parallel to Earth's surface. One sensor, the x-axis, is designated as the North-South sensor while the other, y-axis, is designated as East-West. As the compass is rotated through the full 360 degrees of orientation, one of the two sensors always remains within 45 degrees of parallel to the magnetic field. This is important because magnetic compass sensors lose most of their sensitivity when more than 60 degrees out of parallel with the magnetic field. With a magnetic sensor on each of the x and y axes, the azimuth as compared to magnetic north is calculated as the arctangent of the result of the x-axis divided by the y-axis. In most cases, the magnetic bearing must be corrected to obtain a true physical bearing with other compensations made for hard and soft iron interferences. Such issues are well-known to those skilled in compass design.

Earth's magnetic field exists in arcs between its north and south magnetic poles as is well known to those skilled in compass design. These arcs give the magnetic field a vertical component that varies according to the latitude on Earth's surface at which a measurement is made. For accurate operation, a two-axis compass should be oriented in parallel to the horizontal component of the magnetic field or else the vertical component of the magnetic field will cause a false reading of the field's horizontal component. Even a one degree deviation from parallel can result in a two degree error in the compass reading. Some compass designs utilize mechanical gimbals or fluid bearings to hold the compass sensor parallel with Earth's surface. Such designs add cost, require settling time after rapid changes in orientation, and are comparatively fragile.

One way to overcome compass error caused by operating a two-axis compass that is not parallel to the Earth's surface is to add a third magnetic sensor that is positioned orthogonal to the x and y axis sensors. This third sensor is commonly called the z-axis sensor and its configuration and use are well known to those skilled in the art of electronic compass design. Three-axis magnetic sensor compass designs greatly benefit from accurate readings of both pitch and roll angles so as to compensate for the vertical component of earth's magnetic field. The use of such gravitational sensors and their limitations is well-known to those skilled in compass design.

Embodiments of the invention overcome the above described problems by mounting two accelerometer elements on an aimer at right angles to one another such that both elements are placed perpendicular to the earth's gravitational field, with one element parallel to the pitch plane of the aimer and the other parallel to the roll plane of the aimer. The pitch plane sensing element is oriented so that its plane is at angle $\alpha$ to the earth's gravitational field when the aimer's reference plane is parallel to the earth's gravitational field. For example, when the aimer is pointed at the horizon, the pitch accelerometer element is parallel to a line set to angle a below the horizon. Further, when the aimer is pointed at the zenith, the accelerometer is parallel to a line set at angle a above the horizon.

This strategic placement of the accelerometer pitch sensor allows the 0 to 90 degree range of pitch used by the aimer to point to any location in the sky while keeping the accelerometer sensor within a reasonable angle of perpendicular to the earth's gravitational field where maximum sensitivity is obtained. For example, if angle $\alpha$ is −45 degrees, the pitch accelerometer element is rotated from 45 degrees below level to 45 degrees above level while the aimer covers a range of zero to 90 degrees. Thus, the pitch accelerometer element is always within 45 degrees of being perpendicular to Earth's gravitational pull and retains good accuracy. While angle $\alpha$ is typically set at 45 degrees, other angles may prove advantageous in some circumstances.

A −55 degree angle reduces aimer altitude angle accuracy near the horizon but allows altitude measurement past the zenith. For example, assume a south-facing (180 degree azimuth) viewer is using an aimer to identify an object at an altitude of +85 degrees. She notices another object on the north side of the zenith, also at an altitude of +85 degrees. Since the new object is 5 degrees past zenith from her current azimuth, a 0–90 degree altitude sensor would require her to turn a half circle, i.e. to face north, and aim the aimer at 85 degree altitude. Embodiments of the invention allow such a viewer to view the object without a need for changing directions of the aimer. With the accelerometer element in the pitch plane set at −55 degrees to the aimer plane, she could remain in the south-facing direction and simply arch five degrees past zenith. In such a position, the magnetic field/gravitational sensors would then be tilted at +40 degrees, still within the range of accurate measure. Though having the accelerometers at a tilt of −55 degrees degrades accuracy somewhat at or near the horizon, such degradation could be acceptable in many situations because of obstructions caused by trees, house, hills, etc. and the atmospheric distortion encountered in near-horizon views.

Adaptation to a different offset angle of gravitational sensing elements versus aimer plane requires only that the offset is known to the aimer so it may be compensated for in the final altitude angle computation. Embodiments of the invention can use any offset angle from −90 to +90 degrees, including zero degrees.

Even with angle α compensation, the pitch sensor accelerometer will produce inaccurate readings as its roll angle deviates from an orientation perpendicular to earth's gravitational pull. To compensate for that problem, embodiments of the invention use the first accelerometer element (i.e., the one that is aligned parallel to the roll axis of the aimer) to inform the user of any tilt in the roll axis through audio and/or visual means. When the user then adjusts the aimer's orientation to eliminate tilt in the roll axis based on this feedback, the pitch sensor accelerometer element can produce accurate readings within its range.

There are benefits to placing two accelerometer elements in the pitch axis so as to allow an arctangent computation of pitch as earlier described. In such situations, the angle α between pitch sensors and the aimer's reference plane can be adjusted to zero or any other arbitrary angle as may prove useful since the pair allows accurate readings through any pitch orientation. So long as the user feedback from the roll sensor is used to keep roll angle to near-zero, accurate readings of pitch angle will be maintained.

The same sensors just described can be simultaneously used to compensate the three-axis magnetic sensor for changes in pitch angle. The computation must of course account for angle α if the compass sensor elements are aligned with the aimer reference plane, though such compensation is made by a simple addition or subtraction of the angle α to the pitch reading before it is used to compensate magnetic sensor readings.

In some embodiments it might be desirable to use two or more accelerometer sensors in the roll plane and such embodiments are anticipated.

Figure 5:
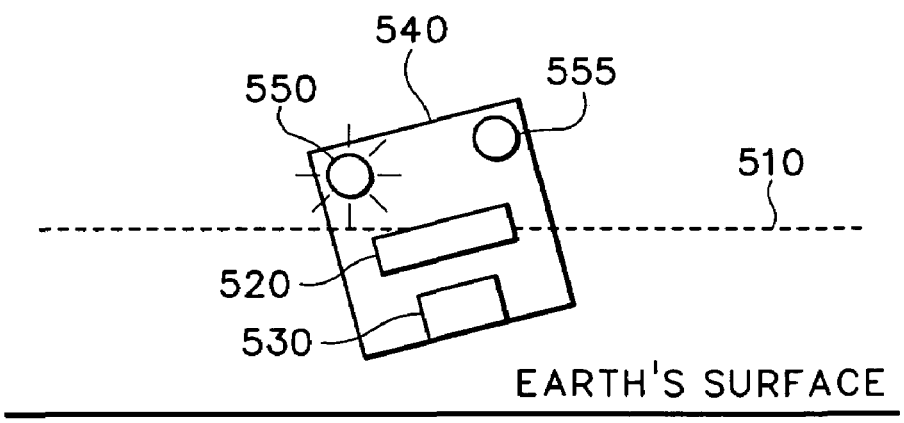

FIG. 5 illustrates an example of roll sensor accelerometer orientation. FIG. 5 illustrates a rear view of an aimer 540 with an accelerometer sensor 520 oriented along a roll plane 510, which is perpendicular to earth's gravitational pull. When the aimer electronics 530 sense that the aimer's orientation has rotated too far counterclockwise, a visual indicator 550 can be illuminated signaling the user to tilt the aimer in the reverse, or clockwise, direction. When the aimer electronics 530 sense that the aimer's orientation has rolled too far clockwise, a visual indicator 555 can be illuminated telling the user to roll the aimer 540 back in the counterclockwise direction. When indicators 550 and 555 are both off, the user has properly oriented the aimer within the roll axis.

Alternately, the visual indicators 550, 555 could both turn on when there is no roll error and one or the other could turn on to indicate the direction in which corrective roll is needed. Any number of visual indicators could be placed in a line and used to indicate the relative degree of roll error. Also, the roll error could be indicated as a numeric value. Visual indicators can be simple Light Emitting Diodes, incandescent light or LCD. Also, the roll error could be indicated on a CRT or video screen or indicated as an audible signal. Further video or audio feedback could be generated through any attached computer or personal device as described above. For instance, if the pitch sensor 520 sensed the aimer 540 was being rolled too far, a special message could be generated through a speaker or display of the attached PDA. All such methods are anticipated.

Figure 6:
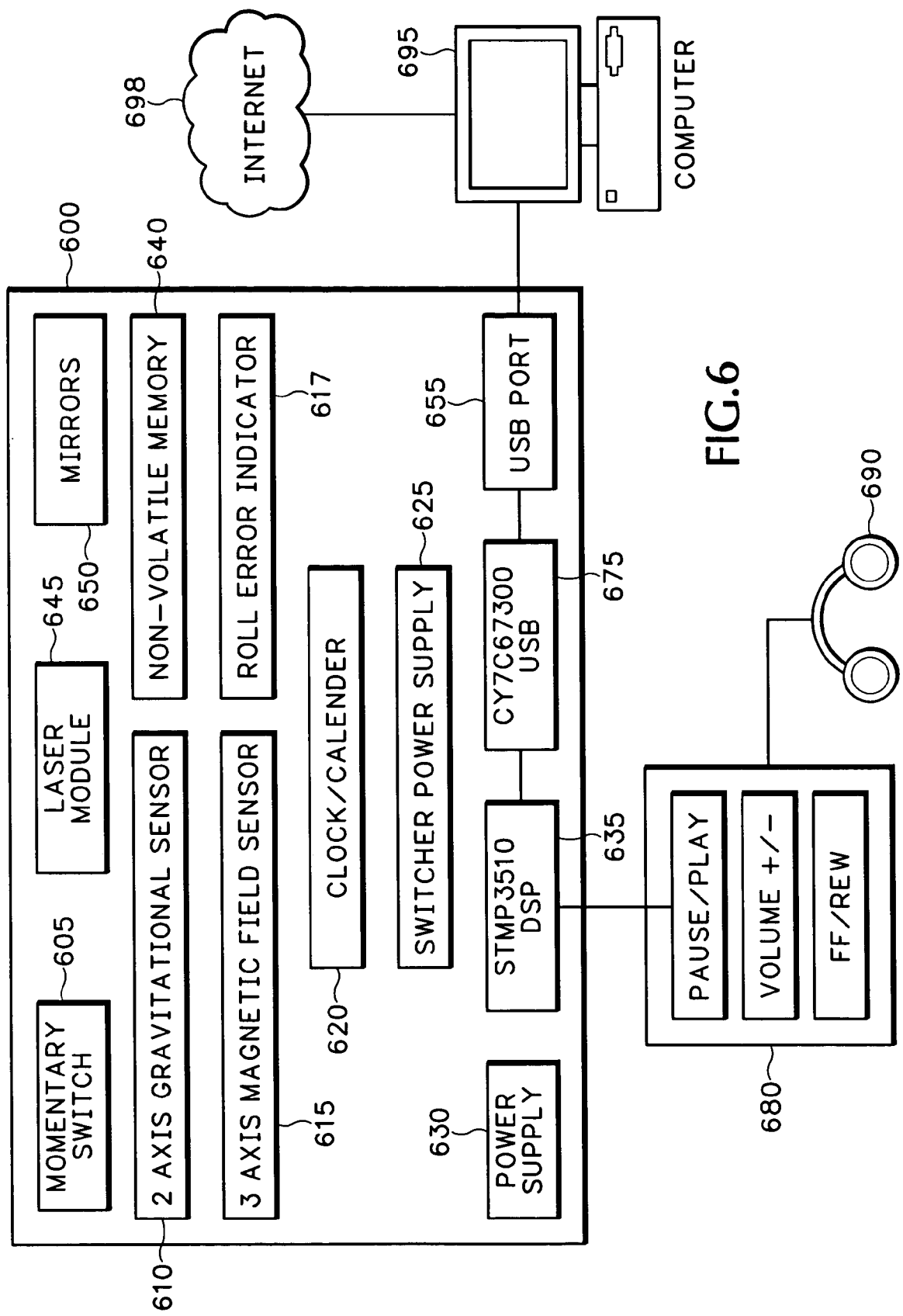

The LGA of FIG. 6 is a functional block diagram of a preferred embodiment of the invention, and is constructed as a single module 600 that is designed for handheld use. Components within FIG. 6 can communicate to each other using various signal lines, buses, or other communication mechanisms etc., as is known in the art.

A 2-axis gravitational sensor 610 can be constructed of, for example, a single Memsic MXD2020 accelerometer chip as each Memsic chip contains a pair of accelerometers oriented at 90 degrees to each other.

A 3-axis magnetic field sensor 615 is used to determine azimuth. Two sensors, x and y, are oriented in a common plane with the third z axis sensor placed in a plane perpendicular to the x and y sensors. Readings from the x and y sensors are combined through an arctangent function to obtain a direction. Readings from the z axis, magnetic sensor, and the two-axis gravitational sensor 610 (corrected for angle α) are combined to correct for errors caused when the x and y magnetic sensors are placed in a plane that is out of parallel with the Earth's surface.

The pitch-axis element of gravitational sensor 610 is aligned at −45 degrees in the pitch plane to the reference plane of the LGA. This allows accurate sensor operation over the entire altitude range from horizon to zenith, 0 to 90 degrees, as previously described.

A Digital Signal Processor (DSP) 635, for example a Sigmatel STMP3510 DSP acquires readings from the gravitational and magnetic sensors 610, 615 and is operated to perform the arctangent combinations and other calculations including any required correction for magnetic deviation (also known as magnetic variation or declination angle) at the user's location on Earth. (Declination angles change very slowly over time. The United States government's National Geophysical Data Center maintains a database of magnetic variations for various locations around the world. The National Geophysical Data Center publishes this information on its website at http://www.ngdc.noaa.gov/seg/geomag/declination.shtml. A computer model to calculate a declination value for locations around the world is also available as the "International Geomagnetic Reference Field Model, version 10".) In addition, the DSP 635 senses errors in roll angle from gravitational sensor 610 and represents that error to the user via Roll Error Indicator 617.

Program code for the various components in the aimer 600, a database of celestial objects, the current user location, magnetic deviation factors and other constants can be stored within non-volatile memory 640.

Clock and calendar circuits 620 are built into the DSP 635 and are used to convert corrected and compensated altitude and azimuth readings from magnetic and gravitational sensors 610, 615 into celestial coordinates.

Power is supplied to all of the above-described circuitry through a power supply 630, which can be, for example, a pair of AA alkaline or lithium batteries connected in parallel. and connected to a switcher power supply 625 that is controlled by circuitry built into the DSP 635. This switching power supply 625 delivers the appropriate voltages required by sensors and laser (3.3 volts), and the DSP 635 itself (which can be, for example, approximately 2.5 volts).

An audio control panel 680 is connected to the DSP 635 through an extra wire on the audio connection to the DSP. These switches in the control panel 680 are read as analog switches and are used to control audio playback of celestial object information. The control panel 680 allows adjustment of audio volume as well as fast forward, rewind, play and pause. Such audio functions and connections through the audio port of a portable digital audio player like the STMP3510 are well known to those skilled in the art of digital audio player design. A stereo headphone is also connected to the DSP 635 to convert the electrical signals from the DSP 635 into audible sound waves that the user can hear. Audio content stored in non-volatile memory 640 and may be stored in a variety of formats including standard WAV files or as compressed audio in MP3, MP3 Pro, AAC, WMA, OGG Vorbis or other format. Such formats are well known to those skilled in the art of audio recording.

In operation, the LGA 600 is turned on by pressing the momentary switch 605 one time. This press awakens the DSP 635 which then applies power to the sensors and activates the laser module 645. The laser in this preferred embodiment is a Leadlight AGPM-105 which emits approximately 5 mw of optical power at 532 mn wavelength. Laser modules of other powers and wavelengths may also be used, or any other appropriate light generator.

Next, the user points the generated laser beam at the celestial object to be identified and again presses the momentary switch 605, which causes the DSP 635 to read the gravitational and magnetic field sensors several times and average them over a period time, for example a period of 100 milliseconds or so. When a stable reading is obtained, a signal is generated, such as by playing a beep through the headphones 690 telling the user that a valid position reading has been made. If the readings are unstable, likely because of the user moving the LGA 600 about during the reading, a message or tone is played telling the user to hold the LGA in a stationary position. The user is also informed of errors in roll angle through the Roll Error Indicator which may include audio and or visual indicators. Further, as described above, the roll error indicator 617 may be coupled to or integrated with the audio control panel 680.

Once a valid reading is obtained, the user can release the momentary switch 605. The DSP 635 then uses current location, time and date to convert the corrected alt-az readings from the sensors into coordinates that are used to categorize celestial objects in the object database. In this preferred embodiment, standard celestial coordinates, as referenced from Greenwich, England, are used, though other coordinates may have advantage in specific applications. The DSP 635 searches through the database to find the object closest to the coordinates determined by sensor readings. If an object is found within a reasonable error tolerance, the audio file that describes that object is caused to play through the audio output to the headphones 690. In this preferred embodiment, tolerance for error is set at + or −2 degrees in both altitude and azimuth, as there are few bright visible celestial objects that fall closer to each other than that. It might be desirable to expand or reduce the tolerance for error in specific situations. If no object is found within the error tolerance, an audio file can be played telling the user that no object was found.

The DSP 635 interfaces to a USB coprocessor 675, for example a Cypress Semiconductor Corporation CY7C67300 which is capable of operating in both USB host and USB Peripheral modes. Such a coprocessor 675 allows connection in a USB peripheral mode to host devices such as personal computers, and connection in a host mode to peripheral devices such as the Apple Computer Inc. iPod. The details of host and peripheral USB operation are well known to those skilled in the design of computer interfaces and need not be further described here. Of course, other data interfaces such as Firewire, Bluetooth, WIFI etc. may also be used to transmit data between the computer 695 and the LGA 600.

The LGA 600 can connect to a personal computer 695 through USB connector port 655. This connection can be used to configure the LGA with new program code or audio content. The personal computer 695 can also be used to configure a current location as well as adjust time and date. The personal computer 695 can also be used to signal the LGA 600 that it is to locate a particular category of object: constellations, stars, or planets for example. If the object to be located is in a constellation, the LGA 600 will direct the user to the area of sky in which it is located by causing the emitted laser beam to radiate at an angle that is not coaxial to the LGA, as described previously. Once the constellation is found, the emitted laser beam can be caused to trace the outline of the constellation. A pair of mirrors 650 or lenses can be used to cause the emitted beam to "bend" and to trace celestial objects as earlier described. The methods of using and controlling mirrors to deflect laser beams are well known to those skilled in the art of laser design.

The personal computer 695 also connects to the Internet 698, allowing new program code updates and new content to be obtained electronically from a vendor providing support for the LGA 600.

The personal computer 695 can also obtain both celestial coordinates and adjusted alt-az coordinates from the LGA through USB port 655. This allows the personal computer 695 to display a visual representation of the selected object or the area of the heavens being viewed. Alternatively, the personal computer's memory, processing power and storage space could be used to augment or replace the computational resources contained in the LGA 600.

An Apple iPod, Palm Pilot, cellular phone or other similar device could be used in place of or in conjunction with the personal computer. For purposes of this description the term personal computer represents any type of computer, personal data assistant, digital music player, cellular phone or other computational device with a USB port, for example.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A device for pointing at celestial objects, comprising:
   a three-dimensional housing having a longitudinal axis;
   a gravitational sensor having a reference axis, the gravitational sensor mounted on the housing so that the reference axis is offset from the longitudinal axis of the housing; and
   a laser light generator mounted on the housing and structured to generate a visible indicator beam that appears to intersect one of the celestial objects when the device is in operative condition.

2. The pointing device of claim 1 wherein the gravitational sensor is an inclinometer.

3. The pointing device of claim 1, further comprising a moveable mount coupled between the light generator and the housing, the moveable mount structured to change a position of the light generator relative to the housing.

4. The pointing device of claim 1 wherein the light generator is mounted to the housing in a position to cause the generated indicator beam to be projected in alignment with the longitudinal axis of the housing.

5. The pointing device of claim 4, further comprising a beam deflector.

6. The pointing device of claim 5 wherein the beam deflector is a mirror.

7. The pointing device of claim 5 wherein the beam deflector is a lens.

8. The pointing device of claim 7 wherein the lens is electrically controlled.

9. The pointing device of claim 5 wherein the beam deflector can be controlled to cause the light generator to outline a collection of more than one celestial object.

10. The pointing device of claim 1, further comprising an intensity modulator coupled to the light generator.

11. The pointing device of claim 3, further comprising a motion compensator coupled to the moveable mount and structured to control the moveable mount.

12. The pointing device of claim 11 wherein the motion compensator is structured to control the moveable mount according to a motion of the Earth relative to the celestial objects.

13. The pointing device of claim 11 wherein the motion compensator is structured to control the moveable mount according to a movement of the pointing device.

14. The pointing device of claim 13 wherein the movement of the pointing device is caused by human motion.

15. The pointing device of claim 1 wherein the device comprises a plurality of separate physical components.

16. The pointing device of claim 1, further comprising a user feedback output.

17. The pointing device of claim 16 wherein the output is a speaker.

18. The pointing device of claim 16 wherein the output is a headphone jack.

19. The pointing device of claim 1 wherein the output is a communication bus.

20. The pointing device of claim 1 wherein the reference axis is offset from the longitudinal axis of the housing by −45 degrees.

21. The pointing device of claim 1 wherein the reference axis is offset from the longitudinal axis of the housing by −55 degrees.

22. The pointing device of claim 2 wherein the inclinometer contains fluid.

23. The pointing device of claim 2 wherein the inclinometer measures rotation of a shaft.

24. The pointing device of claim 2 wherein the inclinometer is an accelerometer.

25. The pointing device of claim 24 wherein the accelerometer is a solid state device.

26. The pointing device of claim 24 wherein the accelerometer senses material properties selected from the group of strain, thermal, capacitive, piezoelectric, and resistive.

27. The pointing device of claim 1, further comprising a magnetic sensor coupled to the housing.

28. The pointing device of claim 1, further comprising a roll sensor structured to detect a roll angle of the pointing device.

29. The pointing device of claim 28, further comprising a roll sensor feedback structured to generate a roll signal to a user of the pointing device based on the detected roll angle.

30. The pointing device of claim 29 wherein the roll sensor feedback is structured to generate a visual signal.

31. The pointing device of claim 29 wherein the roll sensor feedback is structured to generate an audio signal.

32. A portable device for locating celestial objects, comprising:
a housing having a pointing end;
a laser light source coupled to the housing and structured to generate a visible indicator beam that appears to intersect one of the celestial objects when the device is in operative condition;
a magnetic sensor coupled to the housing and structured to sense a relative orientation of the housing in a magnetic field; and
a gravitational sensor coupled to the housing and structured to sense a pitch of the housing.

33. The locating device of claim 32 wherein the magnetic field is generated by the Earth.

34. The locating device of claim 32 wherein a direction of a main axis of the housing is different than a direction of the indicator beam.

35. The locating device of claim 32 wherein an output of the magnetic sensor and the gravitational sensor are combined to determine a pointing direction of the indicator beam.

36. The locating device of claim 35, further comprising a connection to a database of objects.

37. The locating device of claim 36 wherein a celestial object in the database of celestial objects is indexed by the pointing direction of the indicator beam.

38. The locating device of claim 36, further comprising a beam deflector structured to point the light source to an object selected from the database.

39. The locating device of claim 36, further comprising a locating feedback signal structured to guide a user to point the locating device in a direction of an object selected from the database.

40. The locating device of claim 32 wherein the gravitational sensor is mounted at an angle relative to an axis of the locating device.

41. The locating device of claim 32, further comprising a roll sensor structured to detect a roll angle of the pointing device.

42. The locating device of claim 41, further comprising a roll sensor feedback structured to generate a roll signal to a user of the pointing device based on the detected roll angle.

43. The locating device of claim 42 wherein the roll sensor feedback is structured to generate a visual signal.

44. The locating device of claim 42 wherein the roll sensor feedback is structured to generate an audio signal.

45. The locating device of claim 36 wherein the database of objects comprises a database of celestial objects.

46. A device for sighting celestial objects, comprising:
a sighting channel oriented in a first direction along a primary axis;
a gravitational sensor structured to measure an orientation of the sighting device between a first position when the primary axis is aimed generally toward the horizon and a second position when the primary axis is aimed generally overhead, the gravitational sensor having a reference plane at an angle offset from the primary axis of the sighting channel.

47. The sighting device of claim 46 wherein the reference plane is offset approximately 45 degrees from the primary axis.

48. The sighting device of claim 46 wherein the reference plane is offset approximately 55 degrees from the primary axis.

49. The sighting device of claim 46 wherein the gravitational sensor is an accelerometer.

50. The sighting device of claim 49 wherein the accelerometer simultaneously senses motion in one or more axes.

51. The sighting device of claim 46, further comprising a roll sensor structured to detect a roll angle of the sighting device.

52. The sighting device of claim 51, further comprising a roll sensor feedback structured to generate a roll signal to a user of the sighting device based on the detected roll angle.

53. The device of claim 46 wherein said gravitational sensor reference plane is substantially orthogonal to a plane containing the first and second positions of the primary axis.

54. A device for locating celestial objects, comprising:
a housing;
a magnetic sensor coupled to the housing and structured to sense orientation in a magnetic field;
a gravitational sensor coupled to the housing and having an orientations, the gravitational sensor structured to measure a pitch of the orientation; and
a gravitational-sensor compensator coupled to the gravitational sensor and structured to generate a pitch of the housing.

55. The locating device of claim 54, further comprising a light generator mounted to the housing and structured to generate an indicator beam.

56. The locating device of claim 54, further comprising a roll sensor structured to detect a roll angle of the housing.

57. The locating device of claim 56, further comprising a roll sensor feedback coupled to the roll sensor.

58. The locating device of claim 54 wherein the housing has a primary axis and the orientation of the gravitational sensor is offset from the primary axis.

59. The locating device of claim 58 wherein the compensator comprises a logic circuit having access to data representing an angle that the orientation of the gravitational sensor is offset from the primary axis.

60. The locating device of claim 59 wherein the logic circuit is programmed to measure an orientation of the housing between a first position when the primary axis is aimed generally toward the horizon and a second position when the primary axis is aimed generally overhead.

61. The locating device of claim 60, further comprising a roll sensor structured to detect a roll angle of the housing.

62. The locating device of claim 61, further comprising a roll sensor feedback structured to generate a roll signal to a user of the device based on the detected roll angle.

63. A method of identifying a celestial object, comprising:
generating a visible laser light beam using a laser that is mounted on a portable housing;
moving the visible laser light beam toward a celestial object until the visible beam appears to intersect the celestial object from an observation position spaced away from the laser light beam axis;
measuring an orientation in a magnetic field of the housing;
determining a pitch angle of the housing;
computing a direction in which the beam is pointing based on the measured orientation and the determined pitch; and
referencing a database of celestial objects using the computed direction.

64. The method of claim 63 wherein computing a direction in which the beam is pointing comprises accounting for the beam not being aligned with the housing.

65. The method of claim 63 wherein determining a pitch angle of the housing comprises generating an output from a gravitational sensor.

66. A method of locating a celestial object, comprising:
selecting, from a database storing information on a number of a celestial objects, a celestial object to be located;
sending location coordinates of the selected celestial object to a data storage component of a locating device;
sensing a pointing direction of the locating device;
generating a visible laser beam in the locating device; and
moving the axis of the generated beam relative to the pointing direction of the locating device to point to the selected celestial object.

67. The method of claim 66 wherein sensing a pointing direction of the locating device comprises using a magnetic sensor.

68. The method of claim 66 wherein sensing a pointing direction of the locating device comprises using a gravitational sensor.

69. The method of claim 66 wherein sensing a pointing direction of the locating device comprises:
sensing an azimuth direction of the locating device with a magnetic sensor; and
sensing a pitch angle of the locating device with a gravitational sensor.

70. A sensing device for an aimer having a reference axis, comprising:
a gravitational sensor coupled to a housing and mounted at non-zero angle to the reference axis, the gravitation sensor structured to measure a pitch of the gravitation sensor; and
a gravitational compensator coupled to the gravitational sensor and structured to generate a signal representing a compensated pitch of the aimer.

71. The sensing device of claim 70, further comprising a magnetic sensor coupled to the aimer.

72. The pointing device of claim 70, further comprising a roll sensor structured to detect a roll angle of the aimer.

73. The pointing device of claim 70, further comprising a roll sensor feedback structured to generate a roll signal to a user of the aimer based on the detected roll angle.

74. The pointing device of claim 73 wherein the roll sensor feedback is structured to generate a visual signal.

* * * * *

UNITED STATES PATENT AND TRADEMARK OFFICE
CERTIFICATE OF CORRECTION

PATENT NO. : 7,197,829 B2
APPLICATION NO. : 11/120394
DATED : April 3, 2007
INVENTOR(S) : John F. Acres It is certified that error appears in the above-identified patent and that said Letters Patent is hereby corrected as shown below:

At Column 15, line 28, please replace "orientations" with --orientation--;

At Column 15, line 39, please replace "roil" with --roll--;

At Column 16, line 44, please replace "gravitation" with --gravitational--;

At Column 16, line 45, please replace "gravitation" with --gravitational--.

Signed and Sealed this

Sixth Day of November, 2007

JON W. DUDAS
*Director of the United States Patent and Trademark Office*